United States Patent
Li et al.

(10) Patent No.: US 9,344,733 B2
(45) Date of Patent: May 17, 2016

(54) FEATURE-BASED CLOUD COMPUTING ARCHITECTURE FOR PHYSICS ENGINE

(71) Applicant: Samsung Electronics Company, Ltd., Suwon, Gyeong gi-Do (KR)

(72) Inventors: Bo Li, San Jose, CA (US); Tasneem Brutch, Santa Clara, CA (US); Guodong Rong, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 14/142,615

(22) Filed: Dec. 27, 2013

(65) Prior Publication Data

US 2015/0187131 A1    Jul. 2, 2015

(51) Int. Cl.
*G06T 17/20* (2006.01)
*H04N 19/20* (2014.01)
*G06T 9/00* (2006.01)

(52) U.S. Cl.
CPC ............ *H04N 19/20* (2014.11); *G06T 9/001* (2013.01)

(58) Field of Classification Search
USPC ................................................ 345/419, 420
See application file for complete search history.

(56) References Cited

U.S. PATENT DOCUMENTS

| 8,000,941 | B2 * | 8/2011 | Olson | 703/1 |
| 8,458,188 | B2 * | 6/2013 | Salemann | 707/741 |
| 8,949,179 | B2 * | 2/2015 | Besen et al. | 707/610 |
| 2005/0168460 | A1 * | 8/2005 | Razdan et al. | 345/419 |
| 2006/0284869 | A1 * | 12/2006 | Kasprzak et al. | 345/420 |
| 2006/0290693 | A1 | 12/2006 | Zhou et al. | |
| 2007/0088792 | A1 | 4/2007 | Piper et al. | |
| 2008/0043021 | A1 | 2/2008 | Huang et al. | |
| 2008/0074419 | A1 * | 3/2008 | Museth et al. | 345/420 |
| 2009/0024370 | A1 * | 1/2009 | Scott et al. | 703/2 |
| 2010/0198565 | A1 * | 8/2010 | Jayaram et al. | 703/1 |
| 2012/0169748 | A1 | 7/2012 | Merrill et al. | |
| 2012/0229445 | A1 | 9/2012 | Jenkins | |
| 2012/0275687 | A1 | 11/2012 | Lowe et al. | |
| 2012/0299938 | A1 | 11/2012 | Iwasaki | |
| 2013/0215115 | A1 * | 8/2013 | Jenkins | 345/420 |

FOREIGN PATENT DOCUMENTS

KR    10-2013-0030124    3/2013

OTHER PUBLICATIONS

Xinju Li "Feature Points on Point-Based Surface and Their Applications", Published 2009.*

(Continued)

*Primary Examiner* — Kimbinh T Nguyen
(74) *Attorney, Agent, or Firm* — Sherman IP LLP; Kenneth L. Sherman; Hemavathy Perumal

(57) ABSTRACT

A method for shape compression and physics processing is provided. One embodiment includes providing a volume model including a shape with one or more complex portions. The volume model is preprocessed based on: processing a surface of the volume model for obtaining a global structure, and mapping surface elements to a cube surface. The global structure and a result of the mapping is synchronized between a first electronic device and a second electronic device. The second electronic device performs shape modeling using the global structure and the result of the mapping, physics computing for shape deformation based on the shape modeling, and coding deformed shape features for generating surface shape characteristic elements.

30 Claims, 8 Drawing Sheets

(56) References Cited

OTHER PUBLICATIONS

Sederberg, T.W. et al., "Free-Form Deformation of Solid Geometric Models", Proceedings of the 13th Annual Conference on Computer Graphics and Interactive Techniques (SIGGRAPH '86), Aug. 18-22, 1986, pp. 1-10, vol. 20, No. 4, ACM, United States.

Guthe, M. et al., "GPU-based trimming and tessellation of NURBS and T-Spline surfaces", Proceedings of the 2005 SIGGRAPH, Jul. 31, 2005, pp. 1-8, ACM, United States.

Floater, M.S., "Mean Value Coordinates", Computer Aided Geometric Design, Mar. 1, 2003, pp. 1-9, vol. 20, Issue 1, Norway, Netherlands.

Forsey, D.R. et al., "Surface Fitting with Hierarchical Splines", Computer Graphics Laboratory, Jan. 1, 1995, pp. 1-19, University of Waterloo, Ontario, Canada.

Tarini, M. et al., "PolyCube-Maps", Proceedings of the 2004 SIGGRAPH, Aug. 8, 2004, pp. 853-860, ACM, United States.

Qin, H. et al., "D-NURBS: A Physics-Based Framework for Geometric Design", Proceedings of the IEEE Transactions on Visualization and Computer Graphics, Mar. 1996, pp. 85-96, vol. 2, No. 1, IEEE, United States.

Li, B. et al., "Surface Mesh to Volumetric Spline Conversion with Generalized Ploycubes", Proceedings of the IEEE Transactions on Visualization and Computer Graphics, Sep. 2013, pp. 1539-1551, vol. 19, No. 9, IEEE, United States.

Li, B. et al., "Generalized PolyCube Trivariate Splines", Proceedings in the 2010 Shape Modeling International Conference (SMI), Jun. 21-23, 2010, pp. 261-265, United States.

Li, B. et al., "Component-aware Tensor-product Trivariate Splines of Arbitrary Toplogy", Computer & Graphics, Mar. 15, 2012, pp. 1-14, Elsevier, Netherlands.

* cited by examiner

FEATURE-BASED CLOUD COMPUTING ARCHITECTURE FOR PHYSICS ENGINE

TECHNICAL FIELD

One or more embodiments generally relate to performance enhancement for shape compression and physics simulation and, in particular, to a compact feature-based architecture for shape compression, physical simulation and cloud based parallel computing.

BACKGROUND

Advances in three-dimensional (3D) scanning and acquisition techniques have given rise to the increases of volumetric digital shape models in physics simulation. Traditional shape representation (e.g., triangle mesh) and simulation methods are incapable of real-time simulation. This drawback overshadows many potential applications, especially high performance real-time interactive requirements on ever growing high resolution complex simulation scenarios for usages, such as mobile gaming, remote surgery, 3D navigation, 3D digital cameras and printing, 3D-user interfaces (UI), mobile virtual reality, 3D shape web searching, etc. Additionally, current mobile platforms, such as smart-phones, are assembled with limited: computation ability, storage and transmission capability.

In conventional mobile device architecture, shape representation mainly focuses on allowing more shape complexity during designing models. The focus on shape complexity determines that discrete/irregular models, such as point cloud and triangle mesh, are widely used because of their high flexibility for representing complex shapes. This modeling standard causes severe storage, transmission and numerical computing obstacles. For example, a game designer creates a mid-size/resolution surface model (e.g., with $512^2 \times 6$ vertices within 6 faces) in the physics-based simulation engine. Therefore conversion to a volumetric model ($512^3$ vertices) is required. Thus, a model's vertex number increases to a higher order of magnitude. The increase in data is intolerable during practice, especially on mobile devices with limited resources. Not only is the intolerance due to the pressure from limited storage, but mainly because this data explosion brings out unrealistic need of increased numerical computation ability and transmission bandwidth.

Currently the Internet bandwidth download/upload average is about $10^4$ kb/s. A real-time simulation typically requires at least 50 frames per second. Thus, transmission of only 2000 bits is available for updating one frame. This bandwidth limitation severely hampers simultaneous transmission for a large number of models.

SUMMARY

One or more embodiments generally relate to shape compression and physics processing. One embodiment includes providing a volume model including a shape with one or more complex portions. In one embodiment, the volume model is preprocessed based on: processing a surface of the volume model for obtaining a global structure, and mapping surface elements to a cube surface. In one embodiment, the global structure and a result of the mapping is synchronized between a first electronic device and a second electronic device. In one embodiment, the second electronic device performs shape modeling using the global structure and the result of the mapping, physics computing for shape deformation based on the shape modeling, and coding deformed shape features for generating surface shape characteristic elements.

One embodiment provides a method for displaying a volume shape. In one embodiment, a volume model comprising a shape including one or more complex portions is preprocessed based on: processing a surface of the volume model for obtaining a global structure, and mapping surface elements to a cube surface. In one embodiment, the global structure and a result of the mapping is synchronized between a first electronic device and a second electronic device. The first electronic device performs: decoding surface shape characteristic elements using the global structure and the result of the mapping.

In one embodiment a non-transitory computer-readable medium having instructions which when executed on a computer perform a method comprising: providing a volume model comprising a shape including one or more complex portions. In one embodiment, the volume model is preprocessed based on: processing a surface of the volume model for obtaining a global structure, and mapping surface elements to a cube surface. In one embodiment, the global structure and a result of the mapping is synchronized between a first electronic device and a second electronic device. In one embodiment, the second electronic device performs coding deformed shape features for providing surface shape characteristic elements to the first electronic device. In one embodiment the first electronic device performs decoding the surface shape characteristic elements using the global structure and the result of the mapping.

In one embodiment, a system comprises a first device that preprocesses a shape including one or more complex portions. In one embodiment, the first device processes a surface of the volume model for obtaining a global structure, and maps surface elements to a cube surface. In one embodiment, a second device synchronizes with the first device using the global structure and a result of the mapping. In one embodiment, one of the first device or the second device codes deformed shape features for generating surface shape characteristic elements. In one embodiment, one of the first device and the second device decodes the surface shape characteristic elements using the global structure and the result of the mapping.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
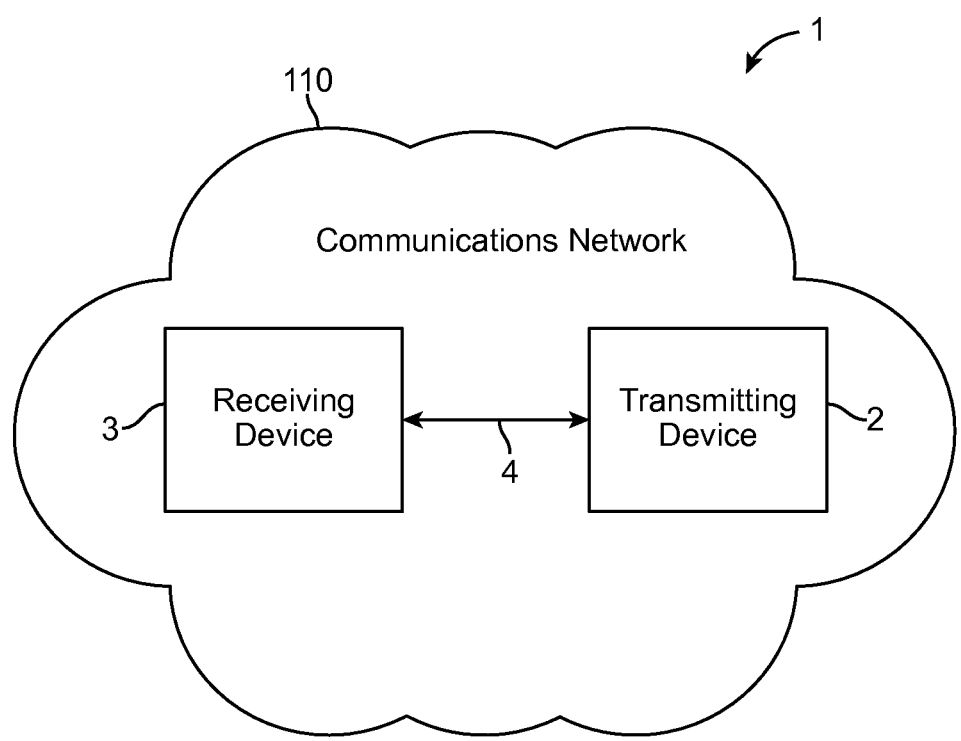
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to a compact feature-based architecture for shape compression, physical simulation and cloud based parallel computing. In one or more embodiments, a client-server architecture is implemented to utilize a high performance computing (HPC) server (e.g., cloud-computing center or graphical processor unit (GPU) for fast physics-based computation. In one embodiment, to overcome the limitation of data transmission bandwidth between a client and server, only a very small dataset of shape characteristic elements or points are extracted and transferred between a client and a server. One or more embodiments provide relative data structures and processes to extract, compress and decode the shape characteristic points on both the client and server sides. In one embodiment, all excessive computing is loaded/transferred on the server side and only light computing (e.g., decoding) is performed on the client side.

One or more embodiments release the power of an HPC server and allow real-time physics computation for arbitrary complex shapes and unlimited body numbers. Complex shape means the geometry property on the shape model or image requires more triangle mesh than "non-complex shapes" (e.g. traditional shape, such as cube, sphere, plane, etc.) to record the shape information. Examples of complex shape models may include the following: the local shape is specialized or custom and cannot be approximated as a general shape like cube/sphere/plane, etc.; the global topology includes many components that are relatively independent to each other and cannot be described together; and the local shape includes many geometric details, such as wrinkles, branches, sharp edges, etc.

One embodiment includes a method that comprises providing a volume model including a shape with one or more complex portions. In one embodiment, the volume model is preprocessed based on: processing a surface of the volume model for obtaining a global structure, and mapping surface elements to a cube surface. In one embodiment, the global structure and a result of the mapping is synchronized between a first electronic device and a second electronic device. In one embodiment, the second electronic device performs shape modeling using the global structure and the result of the mapping, physics computing for shape deformation based on the shape modeling, and coding deformed shape features for generating surface shape characteristic elements or points.

One embodiment includes a method where a volume model comprising a shape including one or more complex portions is preprocessed based on: processing a surface of the volume model for obtaining a global structure, and mapping surface elements to a cube surface. In one embodiment, the global structure and a result of the mapping is synchronized between a first electronic device and a second electronic device. The first electronic device performs: decoding surface shape characteristic points or elements using the global structure and the result of the mapping.

FIG. 1 is a schematic view of a communications system, in accordance with one embodiment. Communications system 1 may include a communications device that initiates an outgoing communications operation (transmitting device 2) and a communications network 110, which transmitting device 2 may use to initiate and conduct communications operations with other communications devices within communications network 110. For example, communications system 1 may include a communication device that receives the communications operation from the transmitting device 2 (receiving device 3). Although communications system 1 may include multiple transmitting devices 2 and receiving devices 3, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 2 and receiving device 3, when located within communications network 110, may communicate over a bidirectional communication path such as path 4, or over two unidirectional communication paths. Both the transmitting device 2 and receiving device 3 may be capable of initiating a communications operation and receiving an initiated communications operation.

The transmitting device 2 and receiving device 3 may include any suitable device for sending and receiving communications operations. For example, the transmitting device 2 and receiving device 3 may include a mobile telephone devices, television systems, cameras, camcorders, a device with audio video capabilities, tablets, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
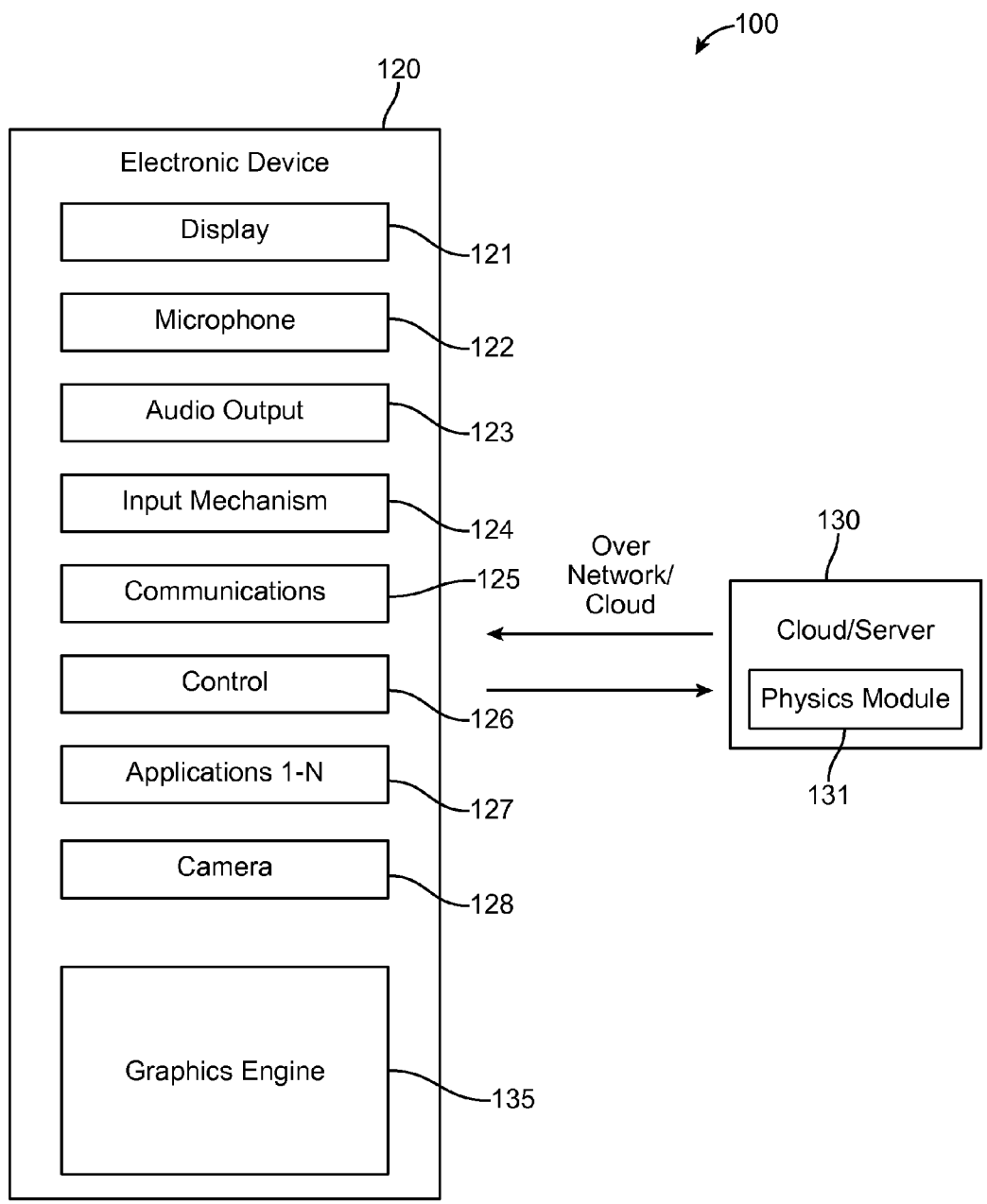
FIG. 2 shows a block diagram of an architecture for a system, according to an embodiment.

FIG. 2 shows a functional block diagram of an architecture system 100 that may be used for providing a compact feature-based architecture for shape compression, physical simulation and cloud based parallel computing between an electronic device 120 and cloud or server 130, according to an embodiment. Both the transmitting device 2 and receiving device 3 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a graphics module 135, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

In one embodiment, the graphics module 135 may provide preprocessing of a volume model comprising a shape including one or more complex portions for obtaining a global structure, and for mapping surface elements to a cube surface. In one embodiment, the graphics module 135 performs decoding of surface shape characteristic points or elements using the global structure and the result of the mapping.

In one embodiment, the server or cloud 130 includes a physics module 131 that may provide preprocessing of a volume model comprising a shape including one or more complex portions by processing a surface of the volume model to obtain a global structure, and mapping surface elements to a cube surface. In one embodiment, the physics module 131 provides shape modeling using the global structure and the result of the mapping, physics computing for shape deformation based on the shape modeling, and coding of deformed shape features for generating surface shape characteristic points or elements. In one embodiment, the global structure and a result of the mapping are synchronized between the electronic device 135 and the cloud or server 131.

Figure 3:
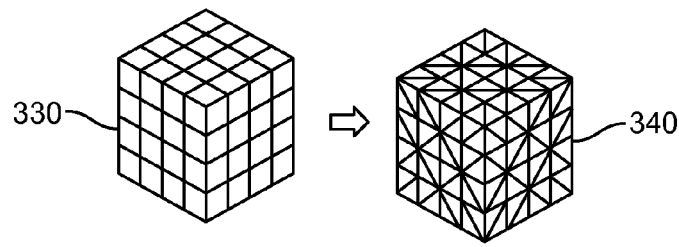
FIG. 3 shows an example where a volume model may have more data to represent than surface model.

FIG. 3 shows an example where a volume model may have more data to represent than surface model. In one example, a cube surface 330 (with $n^2 \times 6$ vertices, n being the size of a square face (e.g., length/width)) is compared to a tetrahedral mesh 340 results in $n^3$ vertices. The large data size is a significant burden to storage devices, data transmission and physical computing in shape-driven applications (e.g., mobile gaming, remote surgery, 3D navigation, 3D digital camera and printing, 3D User Interface (3D-UI), etc.). Additionally, discrete models lack regularity on triangles' connective structure.

Many adaptive simplification and acceleration methods, such as shape compression/multi-resolution/hierarchical/parallel schemes require the regular shape structure, such as a quadrilateral/hexahedral domain. It is difficult to achieve these schemes on an unstructured volumetric domain, such as using a tetrahedron domain. Traditional methods lack precise, continuous mathematical representations. Using discrete models to describe the surface shape immediately excludes the possibility of finding a precise continuous mathematical representation. Besides the deficiency of shape representation, a lack of a continuous mathematical formula also hampers the numerical computation accuracy, such as solving differential equations, which are more frequently used in simulation and are more sensitive to computation accuracy in volumetric modeling and applications. To compensate, extra effort and computations are needed on a discrete model for re-meshing to an appropriate mesh, and developing discrete algorithms to approximate a variety of mathematical operators (e.g., curvatures, gradients, geodesics, etc.). Without accurate geometry and appropriate mesh shape, convergence and high-precision results are impossible.

Figure 4:
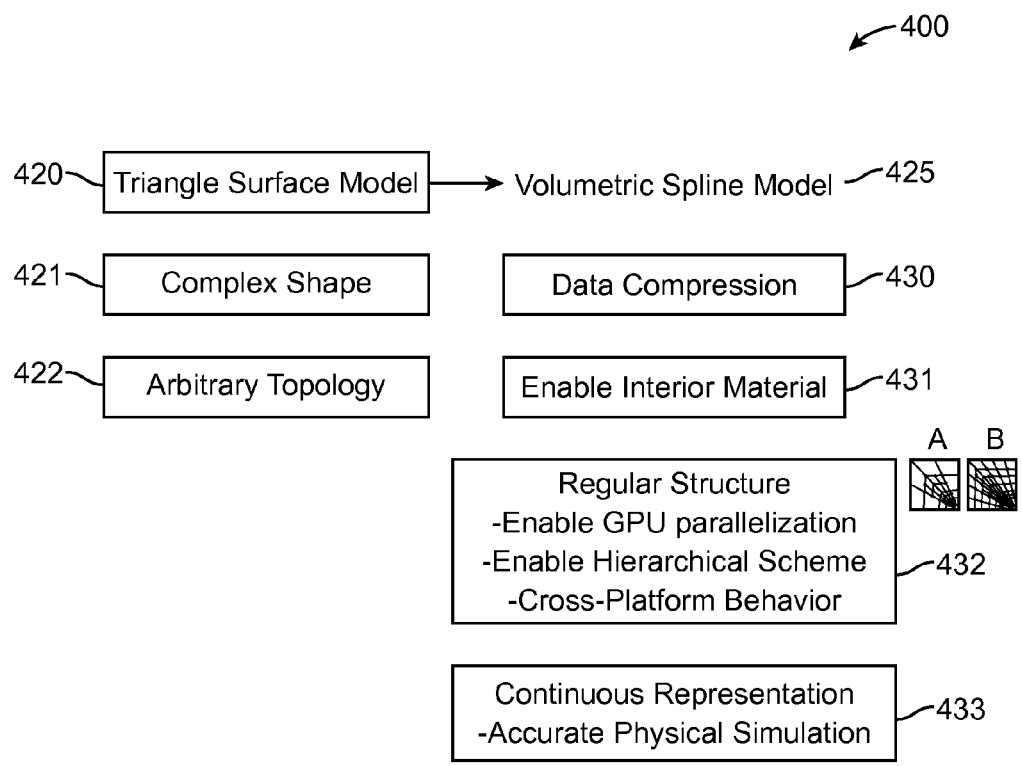
FIG. 4 shows a block diagram of example processes used for a compact feature-based architecture for shape compression, physical simulation and cloud based parallel computing according to one embodiment.

FIG. 4 shows a block diagram of example processes 400 used for a compact feature-based architecture for shape compression, physical simulation and cloud based parallel computing according to one embodiment. In one example embodiment, the input may comprises a triangle surface model 420 that may be used to form a volumetric spline model 425. In one embodiment, for a complex shape processing 421 or an arbitrary topology 422, data compression 430 is implemented. In one embodiment, interior material in enabled in process 431, a regular structure is processed at block 432, where GPU parallelization is enabled, a hierarchical scheme is enabled and cross-platform behavior is implemented. In one embodiment, the hierarchical scheme may include hierarchically adding more points (e.g., from A to B) for improving shape determination accuracy. In one embodiment, hierarchically adding more points may include: for each face of a cube domain, determining each point position using a particular size point grid, for each square cell in the point grid, approximating and evaluating a shape approximation error based on a predetermined threshold. In one embodiment, if the approximation error is larger than the predetermined threshold, more points are added in a square cell for decomposing the square cell into four new square cells. In one embodiment, the position of the points is determined and the approximation error is re-evaluated for each cell. In one embodiment, adding more points hierarchically continues until the approximation error in every square cell is smaller than the predetermined threshold.

In one embodiment, in process block 433 a continuous representation provides accurate physical simulation. In one embodiment, a shape characteristics point extraction process is employed such that client-side (e.g., electronic device 120, FIG. 2) computing power may accomplish the extraction process in real-time. In one embodiment, a regular/hierarchical structure may be used to record the shape feature(s), especially for complex shape/arbitrary topology. In one embodiment, compact/continuous shape representation is generated to describe/approximate this shape feature. In one example embodiment, precise representations are defined upon a structure-enhancement, parallel-friendly poly-cube domain. In one embodiment, the complex shape is decomposed into simple component-aware surface patches. In one embodiment, global parameterization is employed to obtain a consolidated mapping between the shape feature and regular domain. In one example embodiment, when a surface patch is represented using a cube domain, a one-by-one mapping from every point on the surface to one point on the cube domain is employed. In one example embodiment, the surface is considered as a flexible "membrane" that maps on to a cube surface. In one embodiment, one surface point attaches to one point (x, y) on one of six cube faces, then this point's mapping result is (x, y) on this cube face.

In one embodiment, cross-platform behavior using the hierarchical structure provides the following: for the same model, higher/lower resolution are separately used to obtain accurate/fast simulation results on a high/low-end electronic device 120. In one embodiment, the decomposition of a shape model provides parallelization (e.g., processing using both the electronic device 120 and the cloud or server 130, FIG. 2) to accelerate conversion.

Figure 5:
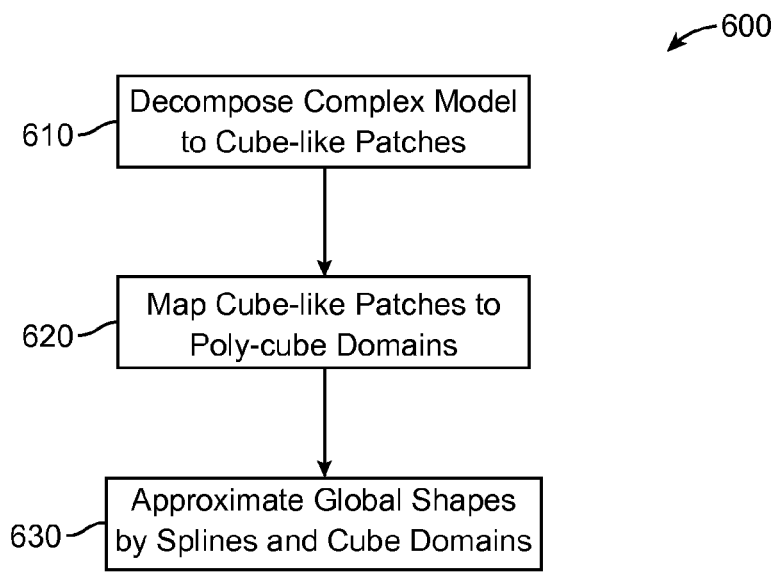
FIG. 5 shows an example block diagram of process blocks for pre-processing a complex shape model, according to an embodiment.

FIG. 5 shows an example block diagram 600 for process blocks for pre-processing a complex shape model, according to an embodiment. In one embodiment, block 610 provides for decomposing a complex shape model to cube like patches. In one embodiment, a high-level abstraction (e.g., domain construction) may start where the surface shape is extracted from the volumetric input. In one embodiment, several component patches are abstracted to represent different parts of the shape. In one embodiment a cube domain is used to represent each of the different parts. In one example embodiment, a poly-cube domain is generated to serve as the regular parametric data structure for shape characteristic elements or points storage.

In one embodiment, in block 610 the shape model is decomposed into several component-aware patches, where each patch represents one cube domain. In one example embodiment, all of the cubes are joined together with an aligned parametric domain size.

In one embodiment, in block 620 mapping is performed to map the cube-like patches to poly-cube domains. In one embodiment, shape regularity or mapping provides a parameterization framework to construct a one-to-one mapping from each vertex on the surface to one location on its corresponding cube domain surface. In one embodiment, both a global-one-piece solution and parallel solution are implemented to follow the trade-off between computing speed and mapping quality.

In one embodiment, in block 630 global shapes are approximated by splines and cube domains. In one embodiment, shape abstraction provides for using only a few "shape characteristic points" (or elements) on the cube surfaces and a continuous representation to approximate all other points. In one embodiment, an efficient hierarchical spline-fitting algorithm is used to support recursive refinement with improved accuracy and a reduced number of control points.

In one embodiment, for the high level abstraction (e.g., domain construction) process in block 610, an appropriate parametric domain is generated in order to simplify the representation of the shape model that has a very complex shape. In one embodiment, a poly-cube like, shape-preserving, mapping-friendly domain is automatically or semi-automatically generated. In one embodiment, the surface model is abstracted only from the volumetric tetrahedral mesh. In one embodiment, all of the important components are detected through an automatic, or semi-automatic process (e.g., similar to a simple user interactive sketch) or skeleton method. In one embodiment, the connection of all patches gives rise to a topological graph. In one embodiment, the model is decomposed into patches according to this topological graph, ensuring that each patch has a very simple topological graph. In one example embodiment, for each patch generated from decomposition, the best fitted cube is computed. In one embodiment, globally, all local poly-cubes are merged together and global poly-cube fitting is performed.

In one embodiment, for the shape regularity or mapping process in block 620, an appropriate mapping is generated between the shape model and the poly-cube that results from block 610. In one example embodiment, an efficient mapping method from a surface input is provided. In one embodiment, parallel-computing of the mapping on each patch and then merging them together is employed. In one example embodiment, for each patch, eight (8) corner points are mapped on the patch to the cube domain corners. In one embodiment, twelve (12) edges on the patch are mapped to the cube domain edges. In one embodiment, six (6) faces on the patch are mapped to the cube domain faces, by solving the harmonic function $\Delta u=0$, $\Delta v=0$, $\Delta w=0$, with the corner and edge mapping as the constraints.

In one embodiment, each patch has eight (8) corner points and twelve (12) edges (where the patches are mapped to cube corners and edges). In one example embodiment, a patch is partitioned into six (6) topological rectangles, then three (3) harmonic mappings are solved ($\Delta u=0$, $\Delta v=0$, $\Delta w=0$) on all rectangles. In one embodiment, the operator $\Delta$ represents one physically-based simulation equation: harmonic equation $$\frac{\partial}{\partial^2 x} + \frac{\partial}{\partial^2 y} + \frac{\partial}{\partial^2 z}.$$

In one embodiment, each time two (2) opposite rectangles are selected as two (2) iso-plane domains on one direction (e.g., u=0 and u=1). In one embodiment, after solving three (3) harmonic mappings, each vertex on the surface patch is mapped to a coordinate $(u_0, v_0, w_0)$ on the cube surface.

In one embodiment, for the hierarchical and regular shape abstraction in block 630, an effective abstraction may be viewed as a point-based approximation: each shape characteristic point $C_i$ (located in parametric cube $D^j$ with local coordinate: $c_i^j$) is associated with knot vectors along principal axes: $r=[r_1, r_2, r_3, r_4, r_5], s=[s_1, s_2, s_3, s_4, s_5]$, where $c_i^j=(r_3, s_3)$. In one embodiment, all knots may be determined using a ray-tracing strategy. In one example embodiment, for any sample point with (u, v, w) as its local parameter, the blending function is $B_i(u, v)=N_r(u) \times N_s(v)$, where $N_r$, $N_s$ are cubic polynomial basis functions associated with the knot vector r, s respectively. In one example embodiment, the formulation for shape representation is $$P(u, v) = \frac{\sum_0^n C_i B_i(u, v)}{\sum_0^n B_i(u, v)}.$$

In one embodiment, the above equation is modified to construct the shapes locally defined in the individual cube. In one embodiment, adjacent local parametric coordinates are transformed coherently by transition functions, which may be encoded in a graph structure. In one example embodiment, the shape representation is:

$$P(h) = \frac{\sum_0^n C_k^i B_k(\phi^{ij}(h^j))}{\sum_0^n B_k(\phi^{ij}(h^j))},$$

where $h^j$ is the local parametric coordinate of point $h^j$ in the cube domain $D^j$, $\phi^{ij}$ is the transition function from cube domain $D^j$ to $D^i$, $C_k^i$, and denotes the control point k in the cube domain $D^i$.

In one embodiment, following the above shape representation definitions, a hierarchical shape characteristic point determining scheme is employed to approximate models. In one embodiment, a sample point in the model, whose parametric coordinate is $h_i$, $h_i$, is used as a spline representation. In one embodiment, the following equations: $E_{dist}=\Sigma_{i=0}^n ||P(h_i)-v_i||^2$ is minimized, which may be rewritten in matrix format:

$$\frac{1}{2} C^T B^T BC^T - V^T BC$$

and solved numerically.

In one embodiment, given a sample parametric point, in order to decide if the approximation needs refinement, the error is measured between its spatial position and its shape approximation. In one embodiment, if the worst approximation result in a small grid is larger than the error threshold, this grid is uniformly divided into eight (8) smaller sub-grids.

Figure 6:
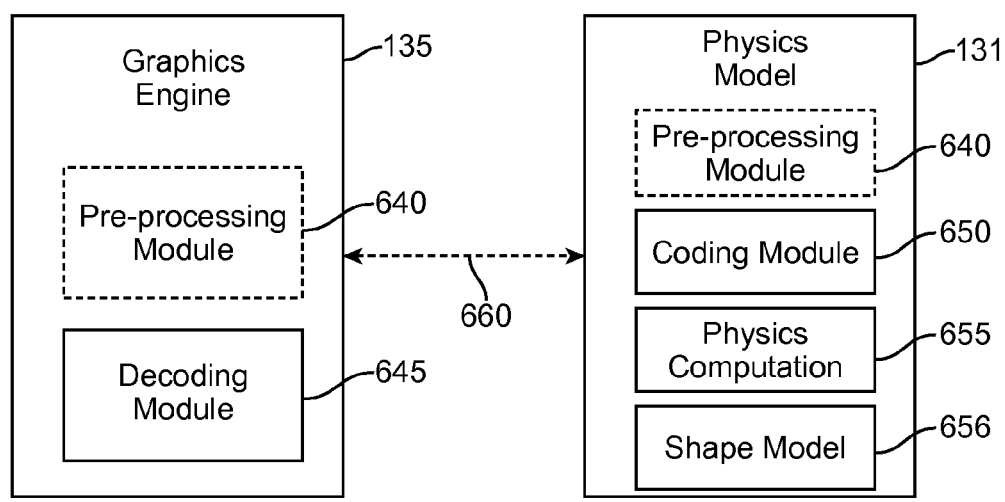
FIG. 6 shows a block diagram of a graphics engine and a physics module, according to an embodiment.

FIG. 6 shows a block diagram of a graphics engine 135 and a physics module 131, according to an embodiment. In one embodiment, the graphics engine 131 may include a pre-processing module 640 and decoding module 645. In one embodiment, the physics module 131 may include a pre-processing module 640, a coding module 650, a physics computation module 655 and a shape model module 656. In one embodiment, the pre-processing modules 640 may be deployed in a client (e.g., electronic device 120 (FIG. 2) or a server or cloud 130. In one embodiment, the pre-processing module 640 may include the pre-processing of a shape model for obtaining a global structure, and mapping surface elements to a cube surface. In one example embodiment, the processing for the pre-processing module 640 may be executed on either of the client device or server device depending on current activities or loads (e.g., applications running), computing performance (e.g., processing power/speed), memory size, etc.

In one embodiment, the graphics engine 135 receives shape characteristic point information from the physics module 131 over a wireless connection 660. In one embodiment, the decoding module 645 decodes coded information received from the physics module 131 via the coding module 650. In one embodiment, the graphics engine 135 and the physics module 131 synchronize with one another using the global structure and a result of the mapping (from the pre-processing module 64). In one embodiment, the shape model module 656 performs shape modeling using the global structure and the result of the mapping, and the physics computation module 655 performs physics computing for shape deformation based on the shape modeling. In one embodiment, the coding module 650 codes deformed shape features for generating surface shape characteristic elements.

Figure 7:
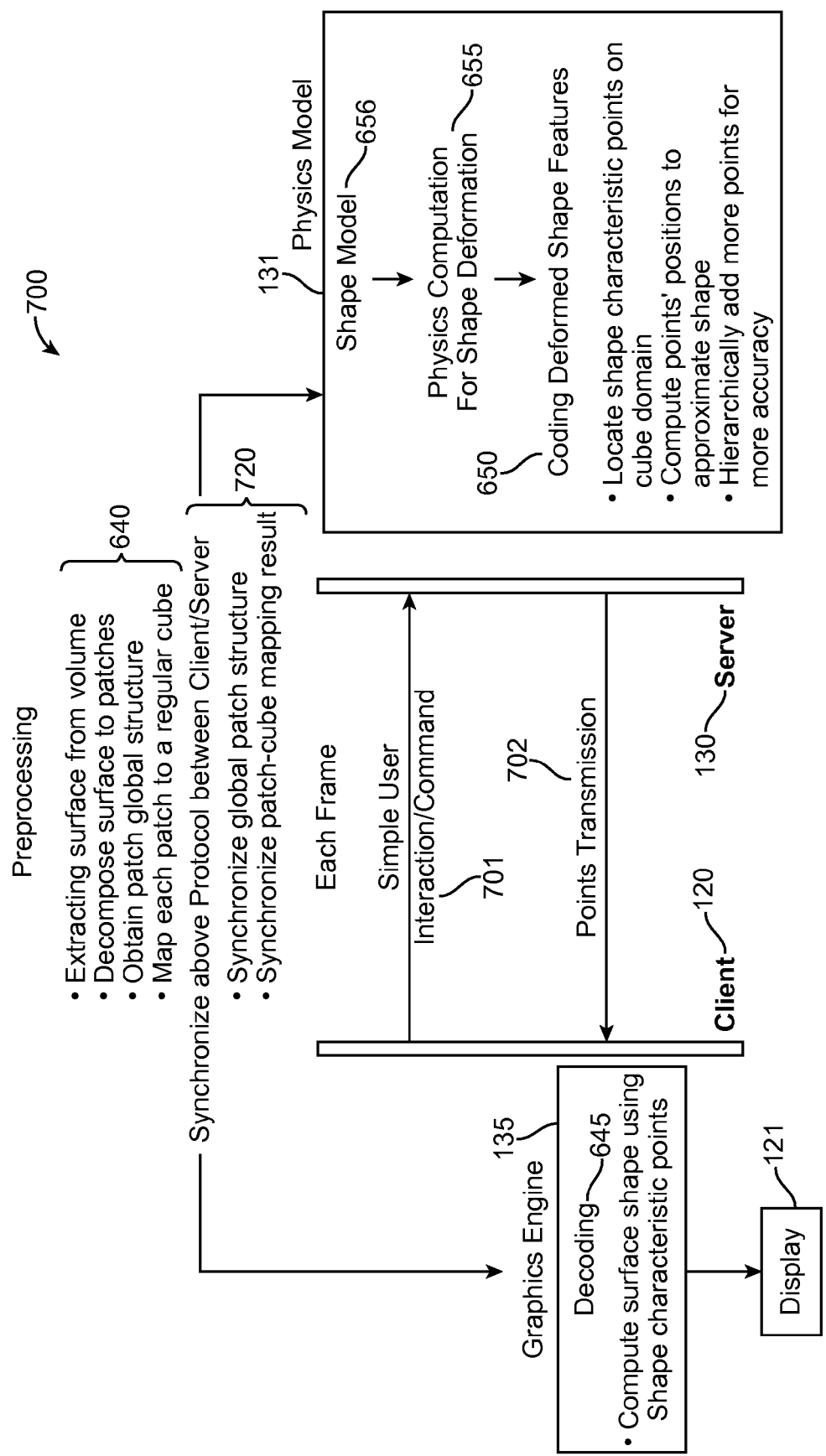
FIG. 7 shows an interaction flow diagram for processing a surface model between a first device and a second device, according to an embodiment.

FIG. 7 shows an interaction flow diagram 700 for processing a surface model between a first device (e.g., a client device, such as electronic device 120, FIG. 1) and a second device (e.g., a server device, such as server or cloud 130), according to an embodiment. In one embodiment, a shape model (e.g., a complex shape model) is obtained (e.g., by the client 120, server 130, etc.). In one embodiment, the obtained shape model is pre-processed using a pre-processing module 640. In one embodiment, after pre-processing is performed, synchronization 720 of the global structure and a result of the mapping takes place between the client device 120 and the server device 130.

In one embodiment, the physics module 131 uses the shape model module 656, physics computation module 655 and coding module 650 to process the shape model using the results of the pre-processing module 640, synchronization 720 and user interface interactions or commands 701 from the client device 120. In one embodiment, the physics module 131 transmits or sends the shape characteristic points information 702 resulting from the coding module 650 processing. In one embodiment, the graphics engine 135 executes the decoding module 645 to decode the coded shape characteristic points information and outputs the result to a display 121 (FIG. 2).

Figure 8:
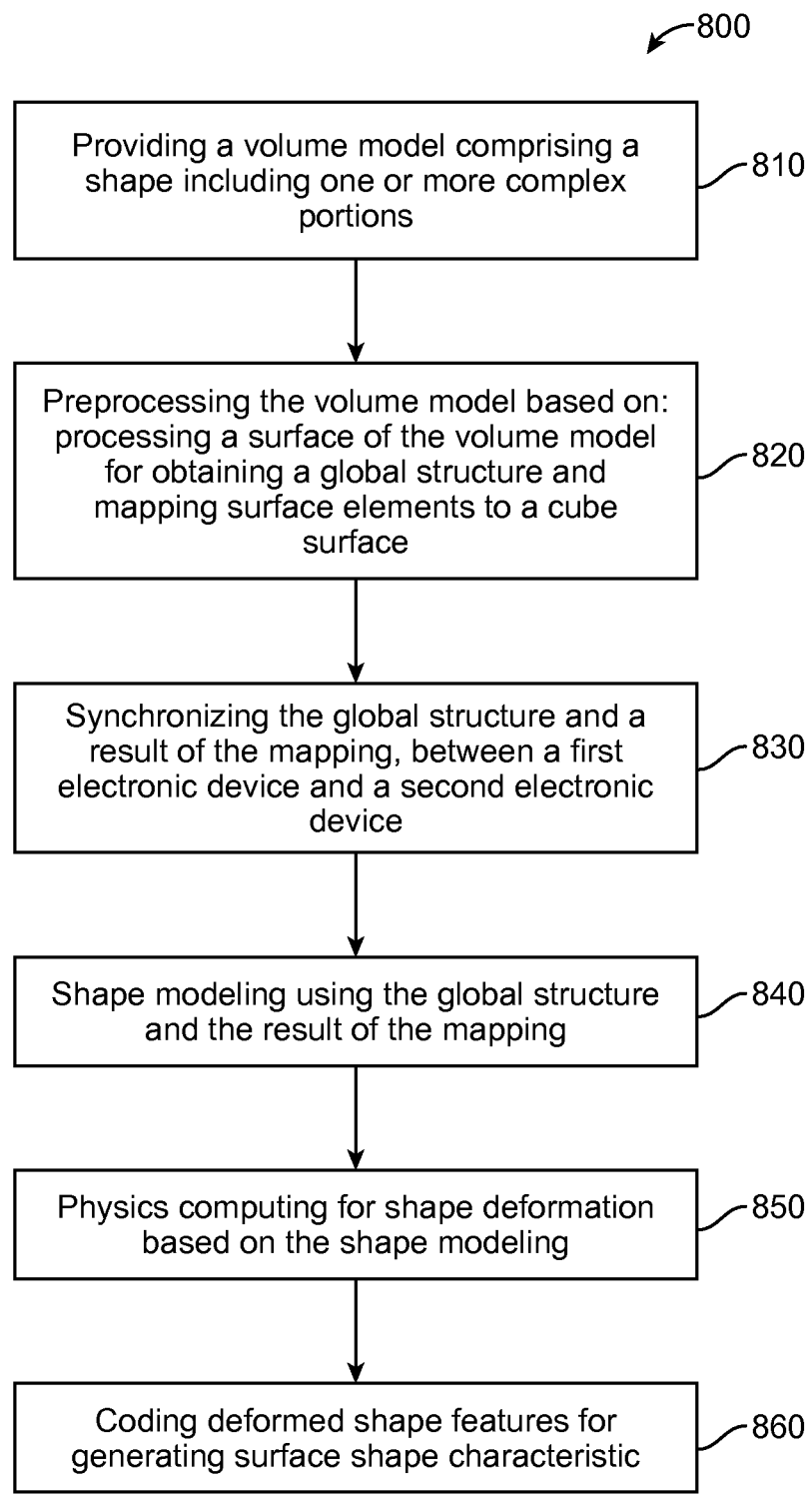
FIG. 8 shows a flowchart for shape compression and physics processing, according to an embodiment.

FIG. 8 shows a flowchart for a process 800 for shape compression and physics processing, according to an embodiment. In one embodiment, in block 810 a volume model comprising a shape including one or more complex portions is provided (e.g., obtained by a client device, such as electronic device 120, obtained by a server device, such as server or client 130, etc.). In one embodiment, in block 820 the volume model is pre-processed based on: processing a surface of the volume model for obtaining a global structure, and mapping surface elements to a cube surface.

In one embodiment, in block 830 the global structure and a result of the mapping is synchronized between a first electronic device (e.g., the client device) and a second electronic device (e.g., the server device). In one embodiment, in block 840 the second electronic device performs shape modeling using the global structure and the result of the mapping. In one embodiment, in block 850, the second electronic device performs physics computing for shape deformation based on the shape modeling. In one embodiment, in block 860, the second electronic device performs coding of deformed shape features for generating surface shape characteristic points or elements.

In one embodiment, process 800 further includes receiving, by the first electronic device, the surface shape characteristic elements, and decoding the surface shape characteristic elements using the global structure and the result of the mapping. In one embodiment, the decoding further comprises updating surface points positions using the surface shape characteristic elements. In one embodiment, process 800 further includes recovering a volume from the surface for displaying a volume shape (e.g., on a display 121, FIG. 2). In one embodiment, process 800 further includes extracting the surface shape from the volume model, decomposing the surface shape to patch elements, and providing the global structure based on the patch elements. In one embodiment, the global structure comprises a global patch structure. In one embodiment, the mapping in block 820 further includes mapping each patch to the cube surface. In one embodiment, the synchronizing in block 830 further includes synchronizing the global patch structure and the result of mapping each patch to the cube surface, between the first electronic device and the second electronic device.

In one embodiment, the coding in block 860 further includes locating shape characteristic points on a cube domain, determining positions of surface points for approximating surface shape, and hierarchically adding more shape characteristic points for improving shape determination accuracy. In one embodiment, hierarchically adding more points includes: for each face of the cube domain, determining each point position using a particular size point grid, for each square cell in the point grid, approximating and evaluating a shape approximation error based on a predetermined threshold; if the approximation error is larger than the predetermined threshold, adding more points in a square cell for decomposing the square cell into four new square cells; and determining the position of the points and re-evaluating the approximation error for each cell. In one embodiment, hierarchically adding more points continues until the approximation error in every square cell is smaller than the predetermined threshold.

In one embodiment, the mapping in block 820 further includes mapping each point on the surface to one point on the cube domain, where one surface point attaches to one point (x, y) on one of six cube faces. In one embodiment, the preprocessing in block 820 is performed on either the first electronic device or the second electronic device.

Figure 9:
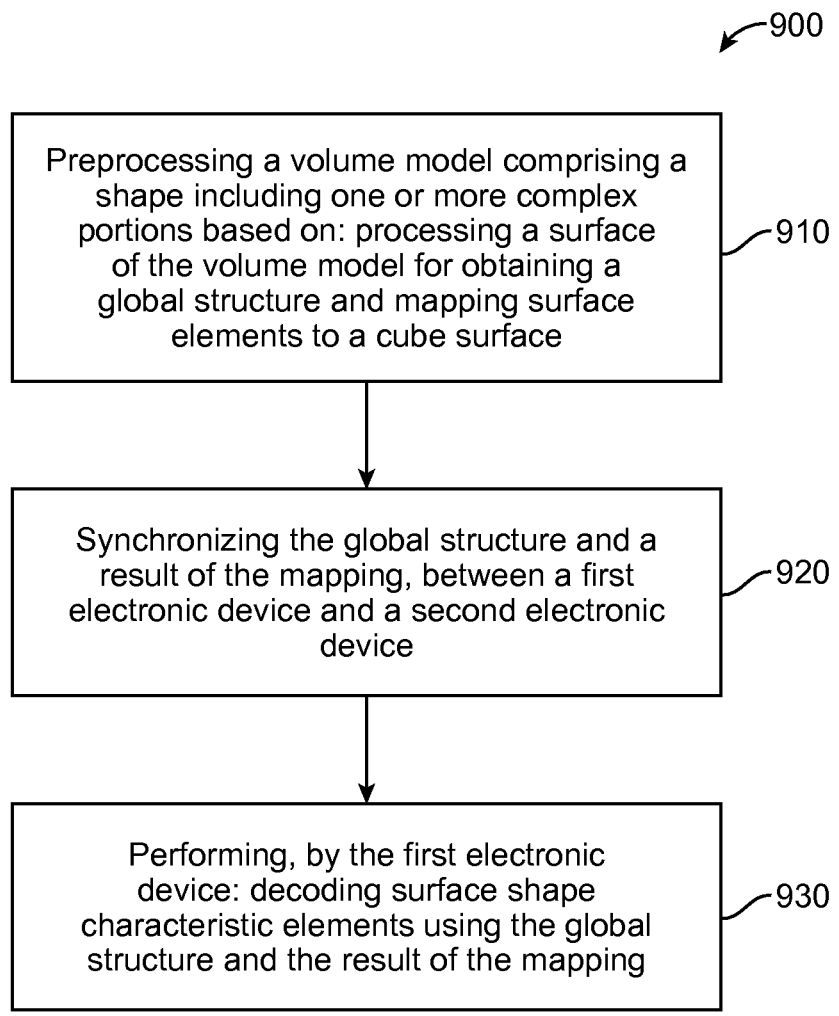
FIG. 9 shows a flowchart for decoding surface shape characteristic elements, according to an embodiment.

FIG. 9 shows a flowchart for a process 900 for decoding surface shape characteristic elements, according to an embodiment. In one embodiment, in block 910 a volume model comprising a shape including one or more complex portions is pre-processed based on: processing a surface of the volume model for obtaining a global structure, and mapping surface elements to a cube surface. In one embodiment, in block 920 the global structure and a result of the mapping is synchronized between a first electronic device (e.g., a client device, such as an electronic device 120, FIG. 2) and a second electronic device (e.g., a server device, such as server or cloud 130). In one embodiment, in block 930, the first electronic device performs decoding surface shape characteristic elements using the global structure and the result of the mapping.

In one embodiment, the process 900 may further include performing, by the second electronic device: shape modeling using the global structure and the result of the mapping, physics computing for shape deformation based on the shape modeling, and coding deformed shape features for providing the surface shape characteristic elements to the first electronic device. In one example embodiment, the decoding in block 930 further includes updating surface points positions using the surface shape characteristic elements. In one embodiment, process 900 may further include recovering a volume from the surface for displaying a volume shape.

In one embodiment, the processing in block 910 further includes extracting the surface shape from the volume model, decomposing the surface shape to patch elements, and providing the global structure based on the patch elements. In one embodiment, the global structure comprises a global patch structure. In one embodiment, the mapping in block 910 further includes mapping each patch to the cube surface. In one embodiment, the synchronizing in block 920 further includes synchronizing the global patch structure and the result of mapping each patch to the cube surface, between the first electronic device and the second electronic device.

In one embodiment, the coding may further include locating shape characteristic points on a cube domain, determining positions of surface points for approximating surface shape, and hierarchically adding more points for improving shape determination accuracy. In one embodiment, hierarchically adding more points includes: for each face of the cube domain, determining each point position using a particular size point grid, for each square cell in the point grid, approximating and evaluating a shape approximation error based on a predetermined threshold; if the approximation error is larger than the predetermined threshold, adding more points in a square cell for decomposing the square cell into four new square cells; and determining the position of the points and re-evaluating the approximation error for each cell. In one embodiment, hierarchically adding more points continues until the approximation error in every square cell is smaller than the predetermined threshold.

In one embodiment, the mapping in block 910 further includes mapping each point on the surface to one point on the cube domain, where one surface point attaches to one point (x, y) on one of six cube faces. In one embodiment, the preprocessing is performed on either the first electronic device or the second electronic device.

Figure 10:
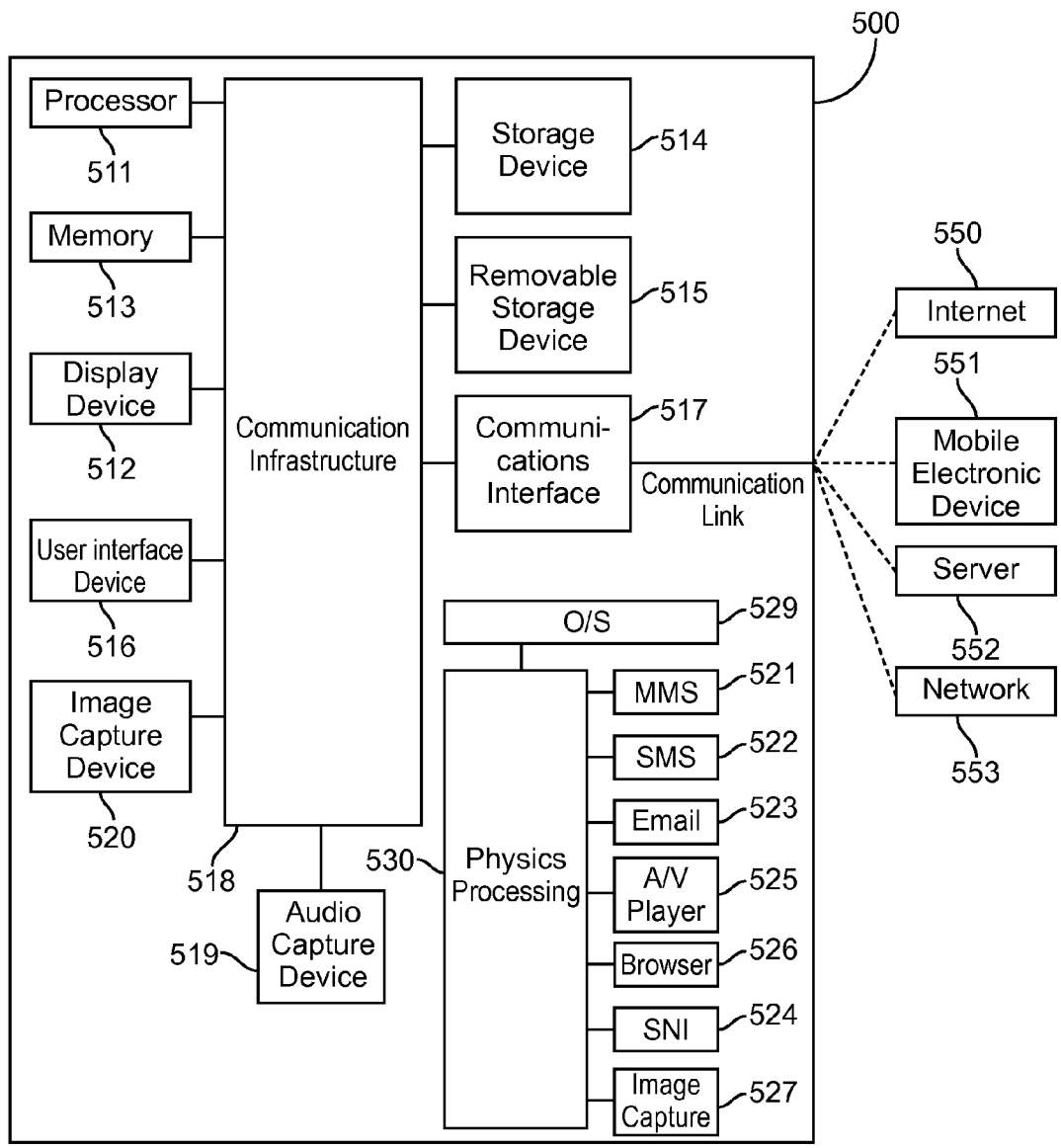
FIG. 10 is a high-level block diagram showing an information processing system comprising a computing system implementing one or more embodiments.

FIG. 10 is a high-level block diagram showing an information processing system comprising a computing system 500 implementing one or more embodiments. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device such as a mobile phone, the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, physics processing 530 along with an operating system 529 may be implemented as executable code residing in a memory of the system 500. In another embodiment, such modules may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for shape compression and physics processing, comprising:
   receiving a volume model comprising a complex shape;
   processing a surface of the volume model by extracting a surface shape from the volume model, and decomposing the surface shape into one or more surface elements;
   obtaining a global structure based on the one or more surface elements;
   mapping each one of the one or more surface elements to a respective cube surface;
   synchronizing the global structure and a result of the mapping with a first electronic device;
   performing shape modeling using the global structure and the result of the mapping;
   performing physics computing for shape deformation based on the shape modeling;
   coding one or more deformed shape features resulting from the shape deformation to generate one or more surface shape characteristic elements; and
   transmitting the one or more surface shape characteristic elements to the first electronic device to enable the first electronic device to compute the surface shape based on the one or more surface shape characteristic elements, the global structure and the result of the mapping.

2. The method of claim 1,
   wherein to compute the surface shape comprises decoding the one or more surface shape characteristic elements using the global structure and the result of the mapping.

3. The method of claim 2, wherein the decoding comprises:
   updating one or more surface points positions for approximating the surface shape using the one or more surface shape characteristic elements.

4. The method of claim 3, further comprising:
   recovering a volume from the surface shape for displaying a volume shape based on the volume recovered.

5. The method of claim 3, wherein:
   each surface element comprises a patch element;
   the global structure comprises a global patch structure; and
   the mapping comprises mapping each one of the one or more patch elements to the respective cube surface.

6. The method of claim 5, wherein the synchronizing comprises:
   synchronizing the global patch structure and the result of the mapping with the first electronic device.

7. The method of claim 5, wherein the coding comprises:
   locating one or more shape characteristic points on a cube surface;
   determining one or more surface points positions for approximating the surface shape; and
   hierarchically adding one or more surface points for improving accuracy of approximating the surface shape.

8. The method of claim 7, wherein hierarchically adding one or more surface points comprises:
   for each face of a cube surface, determining each surface point position for the face using a particular size point grid;
   for each square cell in the size point grid, approximating and evaluating a corresponding shape approximation error based on a predetermined threshold;
   in response to determining a corresponding shape approximation error for a square cell in the size point grid is larger than the predetermined threshold, adding one or more surface points in the square cell for decomposing the square cell into four new square cells; and
   determining each surface point position for each face of the cube surface, and re-evaluating a corresponding shape approximation error for each square cell in the size point grid, wherein hierarchically adding one or more surface points continues until a corresponding shape approximation error for each square cell in the size point grid is smaller than the predetermined threshold.

9. The method of claim 5, wherein the mapping comprises:
   mapping each surface point on each patch element to one point on a cube surface, wherein the point on the cube surface is a point (x, y) on one of six cube faces of the cube surface.

10. The method of claim 1, wherein the method is performed on a second electronic device.

11. The method of claim 10, wherein the first electronic device comprises a mobile electronic device, and the second electronic device comprises a server device.

12. The method of claim 11, wherein the server device operates in a cloud computing environment.

13. A method for processing a volume shape, comprising:
    preprocessing a volume model comprising a complex shape by:
    processing a surface of the volume model by extracting a surface shape from the volume model, and decomposing the surface shape into one or more surface elements;
    obtaining a global structure based on the one or more surface elements; and
    mapping each one of the one or more surface elements to a respective cube surface;

synchronizing the global structure and a result of the mapping with a first electronic device; and transmitting one or more surface shape characteristic elements associated with the volume model to the first electronic device to enable the first electronic device to compute the surface shape based on the one or more surface shape characteristic elements, the global structure and the result of the mapping.

14. The method of claim 13, further comprising:
performing shape modeling using the global structure and the result of the mapping;
performing physics computing for shape deformation based on the shape modeling; and
coding one or more deformed shape features resulting from the shape deformation to generate the one or more surface shape characteristic elements;
wherein to compute the surface shape comprises decoding the one or more surface shape characteristic elements using the global structure and the result of the mapping.

15. The method of claim 14, wherein the decoding further comprises:
updating one or more surface points positions for approximating the surface shape using the one or more surface shape characteristic elements.

16. The method of claim 15, further comprising:
recovering a volume from the surface shape for displaying a volume shape based on the volume recovered.

17. The method of claim 15, wherein:
each surface element comprises a patch element; the global structure comprises a global patch structure; and
the mapping comprises mapping each one of the one or more patch elements to the cube respective surface.

18. The method of claim 17, wherein:
the synchronizing comprises:
synchronizing the global patch structure and the result of the mapping with the first electronic device; and
the coding comprises:
locating one or more shape characteristic points on a cube surface;
determining one or more surface points positions for approximating the surface shape; and
hierarchically adding one or more surface points for improving accuracy of approximating the surface shape.

19. The method of claim 18, wherein hierarchically adding one or more surface points comprises:
for each face of a cube surface, determining each surface point position for the face using a particular size point grid;
for each square cell in the size point grid, approximating and evaluating a corresponding shape approximation error based on a predetermined threshold;
in response to determining a corresponding shape approximation error for a square cell in the size point grid is larger than the predetermined threshold, adding one or more surface points in the square cell for decomposing the square cell into four new square cells; and
determining each surface point position for each face of the cube surface, and re-evaluating a corresponding shape approximation error for each square cell in the size point grid, wherein hierarchically adding one or more surface points continues until a corresponding shape approximation error for each square cell in the size point grid is smaller than the predetermined threshold.

20. The method of claim 17, wherein the mapping comprises:
mapping each surface point on each patch element to one point on a cube surface, wherein the point on the cube surface is a point (x, y) on one of six cube faces of the cube surface.

21. The method of claim 13, wherein:
the method is performed on a second electronic device;
the first electronic device comprises a mobile electronic device; and
the second electronic device comprises a server device.

22. A non-transitory processor-readable medium that includes a program that when executed by a processor performs a method comprising:
receiving a volume model comprising a complex shape;
processing a surface of the volume model by extracting a surface shape from the volume model, and decomposing the surface shape into one or more surface elements;
obtaining a global structure based on the one or more surface elements;
mapping each one of the one or more surface elements to a respective cube surface;
synchronizing the global structure and a result of the mapping with a first electronic device; and
coding one or more deformed shape features associated with the volume model to generate one or more surface shape characteristic elements, wherein the one or more surface shape characteristic elements are transmitted to the first electronic device to enable the first electronic device to compute the surface shape based on the one or more surface shape characteristic elements, the global structure and the result of the mapping.

23. The non-transitory processor-readable medium of claim 22, the method further comprising:
performing shape modeling using the global structure and the result of the mapping; and
performing physics computing for shape deformation based on the shape modeling.

24. The non-transitory processor-readable medium of claim 23, wherein:
the compute the surface shape comprises decoding the one or more surface shape characteristic elements using the global structure and the result of the mapping; and
the decoding comprises updating one or more surface points positions for approximating the surface shape using the one or more surface shape characteristic elements.

25. The non-transitory processor-readable medium of claim 22, the method further comprising:
recovering a volume from the surface shape for displaying a volume shape based on the volume recovered.

26. The non-transitory processor-readable medium of claim 22, wherein:
each surface element comprises a patch element; the global structure comprises a global patch structure;
the mapping comprises mapping each one of the one or more patch elements to the respective cube surface; and
the synchronizing comprises synchronizing the global patch structure and the mapping with the first electronic device.

27. The non-transitory processor-readable medium of claim 26, wherein the coding comprises:
locating one or more shape characteristic points on a cube surface;
determining one or more surface points positions for approximating the surface shape; and hierarchically adding one or more surface points for improving accuracy of approximating the surface shape, wherein hierarchically adding one or more surface points comprises:
- for each face of a cube surface, determining each surface point position for the face using a particular size point grid;
- for each square cell in the size point grid, approximating and evaluating a corresponding shape approximation error based on a predetermined threshold;
- in response to determining a corresponding shape approximation error for a square cell in the size point grid is larger than the predetermined threshold, adding one or more surface points in the square cell for decomposing the square cell into four new square cells; and
- determining each surface point position for each face of the cube surface, and re-evaluating a corresponding shape approximation error for each square cell in the size point grid, wherein hierarchically adding one or more surface points continues until a corresponding shape approximation error for each square cell in the size point grid is smaller than the predetermined threshold.

28. The non-transitory processor-readable medium of claim 27, wherein:
- the mapping comprises mapping each surface point on each patch element to one point on the cube surface, wherein the point on a cube surface is a point (x, y) on one of six cube faces of the cube surface;
- the method is performed on a second electronic device;
- the first electronic device comprises a mobile electronic device; and
- the second electronic device comprises a server device.

29. The non-transitory processor-readable medium of claim 28, wherein the server device operates in a cloud computing environment.

30. A system comprising:
- one or more processors; and
- a non-transitory processor-readable memory device storing instructions that when executed by the one or more processors cause the one or more processors to perform operations including:
  - receiving a volume model comprising a complex shape;
  - processing a surface of the volume model by extracting a surface shape from the volume model, and decomposing the surface shape into one or more surface elements;
  - obtaining a global structure based on the one or more surface elements;
  - mapping each one of the one or more surface elements to a respective cube surface;
  - synchronizing the global structure and a result of the mapping with a first electronic device;
  - performing shape modeling using the global structure and the result of the mapping;
  - performing physics computing for shape deformation based on the shape modeling;
  - coding one or more deformed shape features resulting from the shape deformation to generate one or more surface shape characteristic elements; and
  - transmitting the one or more surface shape characteristic elements to the first electronic device to enable the first electronic device to compute the surface shape based on the one or more surface shape characteristic elements, the global structure and the result of the mapping.

* * * * *